Nov. 8, 1966  F. HERTA  3,284,047
STATIC SEAL
Filed May 7, 1964

FRANK HERTA
INVENTOR.

BY

3,284,047
STATIC SEAL
Frank Herta, Royal Oak, Mich., assignor to Holley Carburetor Company, Warren, Mich., a corporation of Michigan
Filed May 7, 1964, Ser. No. 365,755
5 Claims. (Cl. 251—363)

The invention relates generally to seals, and move particularly to static seals.

While many types of static seals are known, most are not satisfactory for applications wherein the temperatures involved cycle through a large range, say from —320° to +500° F. For example, elastomer seals, such as O rings and the like, become hard and brittle at low temperatures and don't thereafter return to their former cross-sectional dimensions. Gaskets may leak after having undergone the above mentioned temperature range. Other seals, which are satisfactory in operation, include inherent disadvantages which detract from their usefulness. The so-called diaphragm seals, while presumably efficient in operation, require bothersome cover plates which must be fastened down by a plurality of cap screws or similar fasteners.

Still other types of seals have been used with varying success. One of these in current use is a flanged frusto-conical element consisting of a malleable metal such as copper, aluminum or nickel, which, in some instances, is crushed or deformed by a shoulder formed on one of the components being assembled. A disadvantage inherent in such a seal as this is the probability of leakage after repeated disassembly and reassembly. Also, since it is merely placed between two components, and not bonded to either one, there are two potential leak paths through the sealed area.

Accordingly, a general object of the invention is to provide a static seal which will prevent leakage of fluids, including fluids such as liquid air, hydrogen or oxygen, while being exposed to a temperature cycle ranging from —320° to +500° F.

Another object of the invention is to provide such a seal which will prevent leakage of high pressure fluid.

Still another object of the invention is to provide such a seal which may be repeatedly removed and replaced without the possibility of leakage.

A further object of the invention is to provide such a seal which is particularly adapted to either a plug or a valve component.

A still further object of the invention is to provide a seal assembly which consists of only two component parts so as to present only one possible leak path therethrough, as compared to two leak paths when the sealing element is a loose third part.

An additional object of the invention is to provide such a seal assembly in which the two component parts comprise similar materials, thus assuring the same expansion rate throughout the above mentioned temperature cycle.

A more specific object of the invention is to provide such a seal assembly which includes tapered surfaces formed on two mating parts and a Teflon coating of a predetermined thickness bonded onto the tapered surface of one of the parts.

Other objects and advantages of the invention will become more apparent when reference is made to the following specification and accompanying illustrations wherein.

Figure 1:
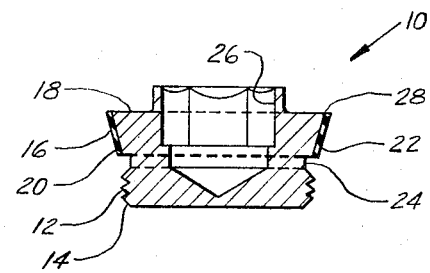
FIGURE 1 is a cross-sectional view of an externally threaded plug having a seal embodying the invention.

Referring now to the drawings in greater detail, FIGURE 1 illustrates a simple plug 10 having external threads 12 formed on one end 14 thereof. A tapered section 16 is formed near the other end 18 of the body 10. A preferred included angle for the tapered section 16 is from 14°45′ to 15°15′, with the smaller diameter end 20 of the tapered section 16 being adjacent the threads 12. A Teflon coating 22 is bonded onto the tapered section 16 to a preferred thickness of from .0015″ to .003″ for a purpose to be described. An annulus 24 is formed around the outer periphery of the plug 10 intermediate the threads 12 and the smaller diameter end 20. Some suitable means, such as a hexagonal cavity 26, is formed adjacent the larger diameter end 28 of the tapered section 16, for the purpose of facilitating the tightening of the plug 10 into an internally threaded component 30.

Figure 2:
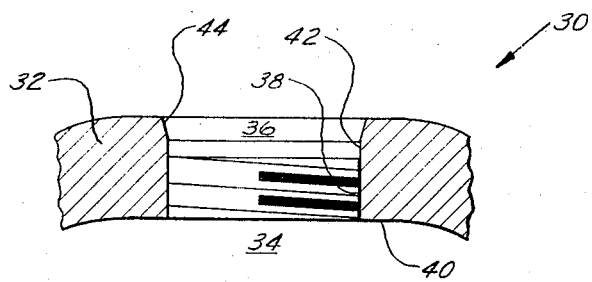
FIGURE 2 is a partial cross-sectional view of a member having an internally threaded opening to receive the plug shown by FIGURE 1.
Figure 4:
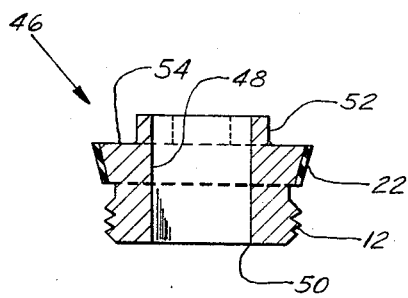
FIGURE 4 is a cross-sectional view illustrating another application of the invention.

FIGURE 2 illustrates a component 30, which may consist of a wall 32 surrounding any chamber (represented generally by 34) into which access through an opening 36 must be provided for machining, adjusting or other purposes. The opening 36 includes a threaded section 38 adjacent the inner side 40 of the wall 32 to receive the threads 12 of the plug 10. An intermediate cylindrical section 42 includes an internal diameter which is approximately .010″ larger than the maximum diameter of the threaded section 40, in order that the threads 12 may be freely inserted. The outermost section 44 of the opening 36 is formed to include the same taper which exists on the tapered section 16 of the body 10, i.e., 14°45′ to 15°15′.

Figure 3:
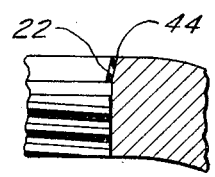
FIGURE 3 is a fragmentary portion of FIGURE 2 showing a modification of the invention.

As illustrated in FIGURE 3, the Teflon coated element may consist of a valve seat element 46. In this case, the hexagonal cavity 26 of the body 10 would be replaced by an opening 48 completely through the element 46. The edge 50 of the valve element 46 serves as a valve seat for any mating valve (not shown) which might be located within the chamber 34. Some suitable means, such as a square or hexagonal projection 52 may be formed on the end 54 of the element 46 to facilitate tightening the element 46 into the threaded opening 36.

The sealing advantages of the invention result from the compression of the Teflon coating 22 of the section 16 (FIGURE 1) against the tapered surface 44 (FIGURE 2), the characteristics of Teflon being such that it fills all the minute grooves and crevices of the surface 44. While the angle 14°45′ to 15°15′ is not critical, an angle within this range has been found to be preferable from the standpoint of providing the best seal, as well as from the standpoint of controlling the depth of entry into opening 36 by plug 10 or element 46 without having to machine the tapered dimensions to extremely close tolerances. Tests have indicated that, once assembled, ideal sealing characteristics are provided throughout a temperature cycle ranging from —320° to +500° F. at a pressure of some 500 p.s.i. within the chamber 34. Tests also indicate that the plug 10 or valve element 46 may be repeatedly removed from the body 30 and reinserted without any change in or diminishing of the sealing characteristics.

It should be apparent that the Teflon coating 22 may be bonded to the surface 44 instead of the surface 16, as shown in FIGURE 3 or to both surfaces. Also, while a Teflon coating is preferred because this material has the ability to recover from prolonged compression at any temperature between —320° F. and +500° F., thus making the seal reusable, any other similar non-metallic material that has this property and can be easily bonded to metal could be employed. Of course, the properties of the material used at various temperatures would determine the usable temperature range of the seal. For example, it has been found that a rubber O ring compressed at —320° F. never returns to its original dimension; thus, it will leak when subsequently taken to higher temperatures.

While but two embodiments of the invention have been disclosed and described, it is apparent that other modifications of the invention are possible within the scope of the appended claims.

What I claim as my invention is:

1. A static seal element comprising a body having external threads formed near one end thereof, a frustro-conical portion formed near the other end thereof, said frustro-conical portion having an axial length less than its smaller diameter and an included angle of substantially 15°, a Teflon coating having a thickness bonded to said tapered portion, an annular groove formed around the periphery of said body intermediate said external threads and said tapered portion, and means formed on said other end for turning said body.

2. A plug, comprising a body having external threads formed near one end thereof, and a sealing section formed intermediate said threads and the other end thereof, said sealing section including a narrow frustro-conical portion having an included angle of substantially 15° and a non-metallic coating of .0015"–.003" thickness bonded to said frustro-conical portion, said coating being a material having the property of recovering from compression at temperatures between —320° F. and 500° F.

3. A plug, comprising a body having external threads formed near one end thereof; a sealing section formed intermediate said threads and the other end thereof, said sealing section including a frustro-conical portion having an included angle of substantially 15° and a Teflon coating of .0015"–.003" thickness bonded onto said frustro-conical portion; and an annular groove formed around the periphery of said body intermediate said external threads and said frustro-conical portion.

4. A valve seat element comprising a body having an axial passageway formed therethrough; external threads formed on one end thereof, a sealing section formed intermediate said threads and the other end thereof, said sealing section including a frustro-conical portion having an included angle of substantially 15° and a non-metallic coating of .0015"–.003" thickness bonded onto said frustro-conical portion, said coating being a material having the property of recovering from compression at temperatures between —320° F. and 500° F.; an annular groove formed around the periphery of said body intermediate said external threads and said frustro-conical portion; and a valve seat formed at some point along said axial passageway.

5. The combination of a body having an internally threaded opening required to be sealed and an externally threaded member to be received in said opening so as to seal the same, said opening and said body having mating frustro-conical portions having included angles of substantially 15°, one of said frustro-conical portions having bonded thereto .0015"–.003" of a non-metallic material capable of recovering from compression over a temperature range within the range on the order of —320° to 500° F., said bonding of said material to one of said frustro-conical surfaces leaving only one leak path between said material and said other frustro-conical surface and said property of recovery from compression making said seal reusable.

References Cited by the Examiner

UNITED STATES PATENTS

| | | | |
|---|---|---|---|
| 1,699,217 | 1/1929 | Wilson | 251—363 X |
| 1,800,995 | 4/1931 | Gaunt et al. | 251—363 X |
| 1,911,455 | 5/1933 | Luff et al. | 220—39 |
| 2,932,531 | 4/1960 | Briechle | 251—363 X |
| 3,093,359 | 6/1963 | De Woody | 251—314 |

FOREIGN PATENTS 538,274  3/1957  Canada.

M. CARY NELSON, *Primary Examiner.*

S. SCOTT, *Assistant Examiner.*